Aug. 16, 1966 E. B. PARKES 3,267,426
VEHICLE DIRECTION INDICATOR SYSTEMS
Filed Dec. 10, 1962
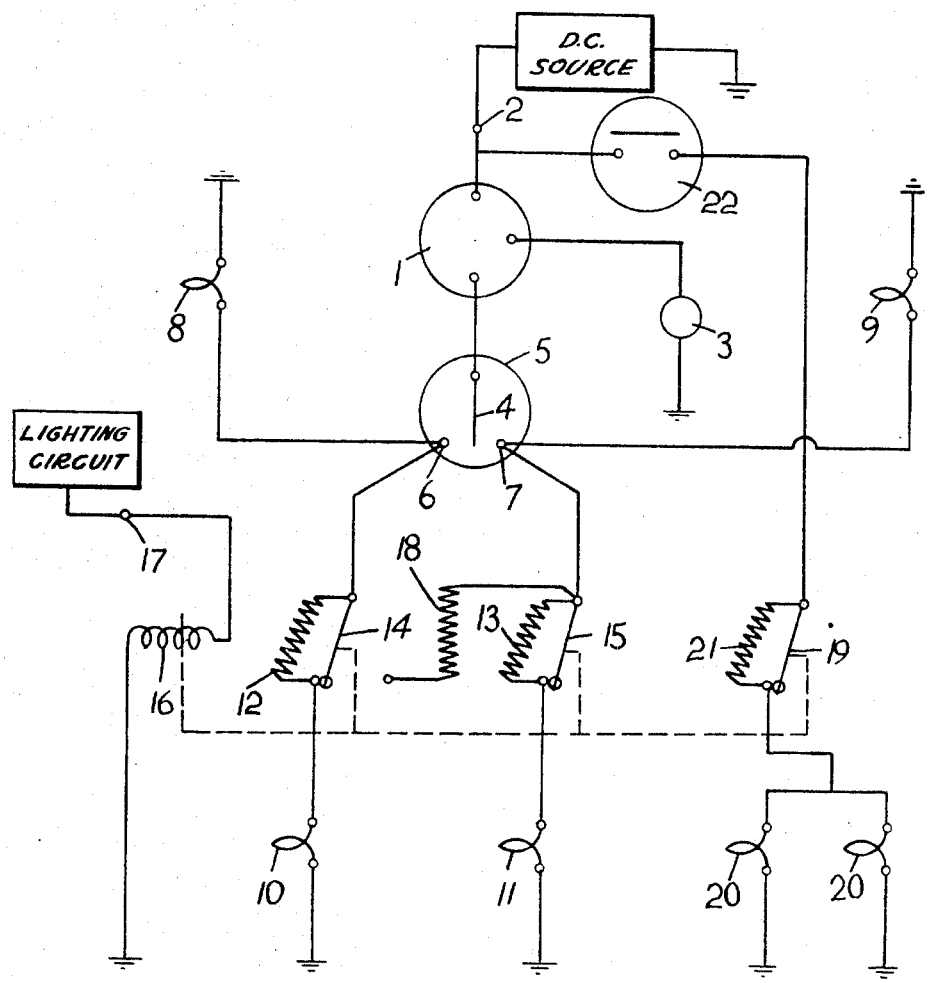

3,267,426
VEHICLE DIRECTION INDICATOR SYSTEMS
Eric Bernard Parkes, Selly Oak, Birmingham, England, assignor to Joseph Lucas (Industries) Limited, Birmingham, England
Filed Dec. 10, 1962, Ser. No. 243,273
4 Claims. (Cl. 340—81)

The object of this invention is to provide a vehicle direction indicator system in a convenient form whereby the rear lamps of a vehicle may be dimmed when desired without substantially changing the frequency of illumination of the lamps.

A vehicle direction indicator system in accordance with the invention comprises in combination a flasher unit adapted for connection to a source of supply, a manually operable three-position switch having a movable contact piece connected to the flasher unit and movable from a neutral position into contact with a pair of fixed contacts through which current can be supplied to lamps on opposite sides of the vehicle respectively, a pair of resistors in the circuits between said fixed contact pieces and the rear lamps on opposite sides of the vehicle respectively, and a pair of switches coupled together for simultaneous operation and movable between a first position in which they short-circuit the pair of resistors respectively and a second position in which they interconnect one end of each of said pair of resistors through a third resistor, the arrangement being such that when the pair of switches are in said second position and the three-position switch is operated to illuminate the lamps at one side of the vehicle, the rear lamp will be dimmed without substantially changing the frequency of illumination of the lamps.

An example of the invention is illustrated diagrammatically in the accompanying drawing.

Referring to the drawing there is provided a thermally-operable flasher unit 1 of any convenient form which is connected to a terminal 2 adapted for connection to a battery through the ignition switch of the vehicle. The battery has one terminal earthed, and the flasher unit is connected to earth through a pilot lamp 3 which is visible to the driver and in use is illuminated in phase with the direction indication lamps. Further, the unit 1 is connected to the movable contact piece 4 of a manually operable three-position switch 5 which is movable from a neutral position to positions in which it connects the flasher unit to fixed contact pieces 6, 7 which are earthed through lamps 8, 9 on opposite sides of the front of the vehicle respectively. The contact pieces 6, 7 are further connected to the rear lamps 10, 11 at opposite sides of the vehicle respectively through a pair of resistors 12, 13.

There is further provided a pair of switches 14, 15 which are ganged together for simultaneous operation, and are preferably either ganged together also with the vehicle lighting switch, or operable as shown by a relay coil 16 connected between earth and a terminal 17 in the normal lighting circuit of the vehicle. The contacts of the switches 14, 15 are movable between the position shown, in which they short-circuit the resistors 12, 13 respectively, and a second position in which they interconnect the ends of the resistors 12, 13 nearer the contact pieces 6, 7 through a resistor 18.

The arrangement is such that during the day the relay coil 16 is de-energised and the switches 14, 15 are in the position shown. Operation of the switch 5 serves to illuminate the lamps 8, 10 or 9, 11 in known manner. When the vehicle lighting switch is closed the relay coil 16 is energised and the switches 14, 15 are moved to the second position. When the manually operable switch is now operated current flows to the lamps 8, 10 or 9, 11 as before, but the rear lamp is dimmed as a consequence of flow through one of the resistors 12, 13. Simultaneously there is a current flow from the flasher unit through the resistor 18, the movable contact of the switch 14, and one of the resistors 12, 13 to the rear lamp at the other side of the vehicle, and also through the other fixed contact of the flasher unit to the front lamp at said other side of the vehicle. This current is not sufficient to illuminate the lamps at said other side of the vehicle, but is sufficient substantially to counterbalance the drop in current resulting from the resistor in series with the illuminated rear lamp. By this means the frequency of illumination of the lamps remains substantially unchanged when the rear lamps are dimmed.

Preferably the relay coil 16 serves to operate a further switch 19 whereby the stop lamps 20 of the vehicle may be dimmed in similar manner to the rear lamps, a resistor 21 being provided for this purpose and the stop lamp switch being indicated at 22.

In a modification, instead of earthing lamps 8, 9 they are connected between the fixed contact pieces 6, 7 and the resistors 12, 13 respectively.

Having thus described my invention what I claim as new and desire to secure by Letters Patent is:

1. A vehicle direction indicator system comprising in combination first and second direction indicating lamps at opposite sides of the vehicle, a terminal for connection to a D.C. source, a manually operable three position switch having a movable contact piece and first and second fixed contact pieces, a flasher unit connected between said terminal and the movable contact piece, first and second resistors through which the first and second fixed contact pieces are connected to the first and second lamps respectively, a third fixed contact piece, a third resistor connected between the second and third contact pieces, a first switch movable between a first position in which it bridges the first resistor and a second position in which it interconnects the first and third contact pieces, a second switch movable between a first position in which it bridges the second resistor and a second neutral position, and means coupling the first and second switches together for simultaneous operation, operation of said three position switch when the first and second switches are in their second positions permitting current flow to one lamp through either the first or second resistor to illuminate the lamp, current also flowing to the other lamp through the third resistor and either the second or the first resistor in series, the resistance of the third resistor being such that current flowing to said lamp is insufficient to illuminate it but is sufficient to maintain the frequency of operation of the flasher unit substantially the same as when the first and second resistors are in their first position.

2. A vehicle direction indicator system comprising in combination first and second direction indicating lamps at opposite sides of the vehicle, a terminal for connection to a D.C. source, a manually operable three position switch having a movable contact piece and first and second fixed contact pieces, a flasher unit connected between said terminal and the movable contact piece, first and second resistors through which the first and second fixed contact pieces are connected to the first and second lamps respectively, a third fixed contact piece, a third resistor connected between the second and third contact pieces, a first switch movable between a first position in which it bridges the first resistor and a second position in which it interconnects the first and third contact pieces, a second switch movable between a first position in which it bridges the second resistor and a second neutral position, a lighting switch controlling the vehicle lighting system, means coupling the first and second switches to the lighting switch so that they are moved to their second positions when the lighting switch is closed, operation of said three position switch when the first and second switches are in their second positions permitting current flow to one lamp through either the first or second resistor to illuminate the lamp, current also flowing to the other lamp through the third resistor and either the second or the first resistor in series, the resistance of the third resistor being such that current flowing to said other lamp is insufficient to illuminate it but is sufficient to maintain the frequency of operation of the flasher unit substantially the same as when the first and second resistors are in their first position.

3. A system as claimed in claim 2 in which the means coupling the first and second switches to the lighting switch comprises a relay having its coil in the lighting system, the first and second contacts being constituted by contacts of said relay.

4. A system as claimed in claim 3 including a pair of stop lamps, a fourth resistor and a brake-operable switch connected in series between the stop lamps and said terminal, and a third relay contact movable from a position in which it bridges the fourth resistor to a neutral position when the relay is energised.

References Cited by the Examiner
UNITED STATES PATENTS

| | | | |
|---|---|---|---|
| 2,667,602 | 1/1954 | Flemming | 340—55 |
| 2,731,584 | 1/1956 | Onksen | 340—67 |

NEIL C. READ, *Primary Examiner.*

T. A. ROBINSON, *Assistant Examiner.*